United States Patent Office 3,061,614
Patented Oct. 30, 1962

3,061,614
PROCESS FOR MAKING BUTYROLACTONE
William M. Sweeney, Wappingers Falls, and John A. Patterson, Fishkill, N.Y., assignors to Texaco Inc., a corporation of Delaware
No Drawing. Filed Dec. 4, 1958, Ser. No. 778,077
5 Claims. (Cl. 260—343.6)

The instant invention relates to a process for making gamma butyrolactone, and more particularly, to such process wherein allyl alcohol is carbonylated to make such lactone. The reaction can be represented by the following equation:

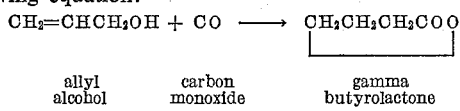

allyl alcohol + carbon monoxide → gamma butyrolactone

The lactone product has value as an intermediate for the preparation of various organic chemicals such as insectifuges.

In essence our process comprises: forming a single liquid phase reaction mixture containing allyl alcohol; in the presence of cobalt carbonylation catalyst and in the substantial absence of molecular hydrogen treating said reaction mixture with carbon monoxide at a temperature not substantially above about 375° F. and at a pressure of at least 500 p.s.i.g.; and thereafter separating gamma butyrolactone from the treated mixture.

Because of the reactivity of allyl alcohol under carbonylation conditions certain controls must be exercised in our process in order to make significant amounts of the butyrolactone product instead of aldehydes, polymers, etc. Thus, for example, molecular hydrogen should be absent or virtually absent from the carbonylation zone, this to prevent the reaction from being directed toward aldehyde production.

Similarly, the establishing of a single liquid phase reaction mixture containing the allyl alcohol is important because this permits substantial carbonylation of the alcohol at a temperature not substantially above about 375° F. The use of higher temperatures than this, such as have been used in the past for the carbonylation of olefins with carbon monoxide and water to make organic acids, is quite rigorous for the sensitive allyl alcohol reactant. Accordingly, forming of the single liquid phase reaction mixture provides an environment for securing substantial carbonylation of the alcohol at moderate temperatures, e.g. 200-375° F.

The preferred temperature for operation is between about 300° and about 360° F., and the pressure should be at least about 500 p.s.i.g. to furnish adequate gaseous carbon monoxide reactant. Advantageously the pressure is at least 1000 p.s.i.g., and preferably it is between about 2000 and 6000 p.s.i.g. The catalyst used can be a conventional cobalt carbonylation catalyst such as dicobalt octacarbonyl (referred to herein simply as "cobalt carbonyl"), cobalt metal, a cobalt soap such as cobalt oleate or cobalt naphthenate, or a heterogeneous cobalt catalyst yielding cobalt carbonyl under reaction conditions. The preferred catalyst is cobalt carbonyl, which is miscible with the reaction mixture. Ordinarily about 0.5 to 3% cobalt carbonyl based on the weight of reaction mixture is adequate for the operation.

We have found it particularly advantageous to use a hydrogen donor in the reaction mixture, said donor selected from the group consisting of water and lower alkanols, i.e., $C_1$–$C_4$ alkanols. The reaction mixture can be made up with miscible diluents, most suitably ones which can be separated from the crude product simply and in conventional manner, e.g. a lower aliphatic ketone such as acetone, methylethyl ketone, or diethyl ketone.

Ordinarily the proportion of hydrogen donor in the reaction mixture will be from 5% to 30% of the entire reaction mixture, but more or less hydrogen donor can be used without significantly affecting the operation, if desired.

Increased yields of lactone also result when a phenolic anti-oxidant such as hydroquinone, or tertiary butyl catechol, or hydroxylamine, or an inorganic or organic or ammonium nitrite polymerization inhibitor is incorporated into the reaction mixture, usually in small amounts below about 5% and ordinarily from 0.1–1%. It is conceivable that certain of these polymerization inhibitors can act as hydrogen donors in the operation.

The concentration of allyl alcohol in the reactor feed appears to affect the yield substantially. We have found that such concentrations of allyl alcohol as high as 30% to 50% are decidedly inferior to those below 30% for yield purposes. Advantageously, the concentration of allyl alcohol in the reaction mixture is between 5% and 25%, and preferably it is about 15% for the best yield. The dilution can come from the hydrogen donor and/or a diluent, if one is used. Other diluents such as ethers and the like can be used also providing a single liquid phase reaction mixture is established and maintained.

Agitation is desirable for the reaction. Batch operation is preferred, but continuous operation in the manner of industrial carbonylations to make aldehydes is also possible.

Materials of construction in the carbonylation reactor are suitably corrosion-resistant, e.g. austenitic stainless steel, glass, silver, and the like. Separation of the butyrolactone product from the reaction mixture is most conveniently done by stripping, fractional distillation, and/or azeotropic distillation.

The following examples show ways in which our invention has been practiced, but should not be construed as limiting the invention. In all examples the liquids constituted a single liquid phase. In this specification all percentages are weight percentages unless otherwise specifically noted. Carbon monoxide uptake (pressure decline from carbon monoxide use) in each instance cited was computed at 70° F.

Example 1

Into a 1.5 liter agitated stainless steel reactor there was charged 58 grams of allyl alcohol, 55 grams of water, 259 grams of acetone, and 7 grams of cobalt carbonyl. These materials were pressured to 3000 p.s.i.g. with carbon monoxide and heated for 3 hours at 350° F. Carbon monoxide uptake was 350 p.s.i. The reaction products were filtered to remove cobalt salts, then stripped of acetone and water to 100° C. (overhead distillation temperature). The stripped residue was distilled to yield an azeotrope, which separated to give 1 gram of a sweet smelling oil, and a final distillation cut of 9 grams, which had a boiling point range from 190° to 210° C. This final cut was redistilled to give 7 grams of gamma butyrolactone having a boiling point range of 200–204° C., a carbon content of 55.2%, and a hydrogen content of 7.58%. The yield based on allyl alcohol charged was 8%.

Example 2

The identical proportions of the same kinds of materials were carbonylated in this run in the way described in Example 1, except that the reaction mixture contained 1 gram of hydroquinone. The product mixture was worked up by fractional distillation and gave 18 grams of gamma butyrolactone. The yield based on allyl alcohol charged was 21%.

Example 3

The following materials were pressured in an agitated 1.5 liter reactor to 3000 p.s.i.g. with carbon monoxide:

116 grams of allyl alcohol; 518 grams of acetone; 110 grams of water; 14 grams of cobalt carbonyl; and 1 gram of hydroquinone. The bomb was heated to 350° F. for three hours, and the uptake of carbon monoxide noted was 850 p.s.i. The product mixture was then worked up by fractional distillation to give 51 grams of gamma butyrolactone, $C_4H_6O_2$, this yield being 30% on the basis of allyl alcohol charged.

*Example 4*

The following materials were pressured in an agitated 1.5 liter reactor to 3100 p.s.i.g. with carbon monoxide then heated to 350° F. for 3 hours: 116 grams of allyl alcohol; 36 grams of water; 320 grams of methyl alcohol; 1 gram of hydroquinone; and 7 grams of cobalt carbonyl. The product was stripped to give a forecut consisting of methyl alcohol, water, and allyl alcohol, then the residue was fractionally distilled to give 12 grams of gamma butyrolactone.

*Example 5*

The following materials were pressured in an agitated 1.5 liter reactor to 3100 p.s.i.g. carbon monoxide and heated to 350° F. for 3 hours: 174 grams of allyl alcohol; 348 grams of acetone; 2 grams of hydroquinone; and 14 grams of cobalt carbonyl. In this period carbon monoxide pressure declined 300 p.s.i. The product was worked up by fractional distillation to give 35 grams of gamma butyrolactone, the conversion of allyl alcohol to butyrolactone being about 14%.

*Example 6*

The following materials were pressured with carbon monoxide to 3100 p.s.i.g. in an agitated 1.5 liter reactor and heated to 350° F. for 8 hours: 174 grams of allyl alcohol; 96 grams of methyl alcohol; 290 grams of acetone; 1 gram of hydroquinone; and 10 grams of cobalt carbonyl. During the reaction period the carbon monoxide pressure decreased 550 p.s.i. The product was worked up by stripping and fractional distillation to give 38 grams of a cut identified as butyrolactone.

*Example 7*

The following run shows the importance of maintaining the allyl alcohol concentration below 30%. The following materials were pressured with carbon monoxide to 3000 p.s.i.g. in an agitated 1.5 liter reactor and heated to 350° F. for 2¾ hours: 232 grams of allyl alcohol; 232 grams of acetone; 7 grams of cobalt varbonyl; 72 grams of water; and 2 grams of hydroquinone. During the reaction period the carbon monoxide pressure decreased by 450 p.s.i. The product was worked up by stripping and fractional distillation to give 23 grams of a cut identified as gamma butyrolactone. The yield of butyrolactone based on allyl alcohol charged was 6.7%, which is quite unfavorable in comparison to those of foregoing Examples 2 and 3 (wherein the allyl alcohol concentration in the reaction mixture charged was 15.3%).

We claim:
1. A process for producing gamma butyrolactone consisting essentially of forming in the absence of molecular hydrogen a single phase reaction liquid consisting essentially of allyl alcohol and a hydrogen donor selected from the group consisting of water and $C_1$ to $C_4$ alkanols, said alcohol being present in an amount of between about 5 and 50 wt. percent based on the reaction mixture and said donor being present in an amount between 5–30% based on said reaction mixture, contacting said liquid in the presence of 0.1 to 5 wt. percent cobalt carbonylation catalyst based on said reaction mixture with carbon monoxide at a temperature between about 200 and 375° F. and at a pressure between about 500–6000 p.s.i.g., and thereafter separating the formed gamma butyrolactone from said reaction mixture.

2. The process of claim 1 wherein said hydrogen donor is water.

3. The process of claim 1 wherein said hydrogen donor is methanol.

4. The process of claim 1 wherein a polymerization inhibitor is incorporated into the reaction mixture.

5. The process of claim 1 wherein the concentration of allyl alcohol in the reaction mixture is between 5% and 25%.

References Cited in the file of this patent
UNITED STATES PATENTS 2,448,368    Gresham et al. _____ Aug. 31, 1948

OTHER REFERENCES

Frank et al.: Jour. American Chem. Soc., vol. 68, p. 908 (1946).
Adkins et al.: J. Am. Chem. Soc., 71, p. (3053 1949).